United States Patent
Suzuki et al.

(10) Patent No.: US 9,885,098 B2
(45) Date of Patent: Feb. 6, 2018

(54) ALUMINUM ALLOY PLATE FOR BATTERY CASES, WHICH HAS EXCELLENT MOLDABILITY AND WELDABILITY

(71) Applicant: Nippon Light Metal Company, Ltd., Tokyo (JP)

(72) Inventors: Kenta Suzuki, Shizuoka (JP); Yasuyuki Oowada, Shizuoka (JP); Hisashi Hori, Shizuoka (JP); Keiji Kanamori, Aichi (JP)

(73) Assignee: Nippon Light Metal Company, Ltd., Tokyo (JP)

(*) Notice: Subject to any disclaimer, the term of this patent is extended or adjusted under 35 U.S.C. 154(b) by 330 days.

(21) Appl. No.: 14/412,327

(22) PCT Filed: Jul. 19, 2013

(86) PCT No.: PCT/JP2013/069678
§ 371 (c)(1),
(2) Date: Dec. 31, 2014

(87) PCT Pub. No.: WO2014/077003
PCT Pub. Date: May 22, 2014

(65) Prior Publication Data
US 2015/0159243 A1    Jun. 11, 2015

(30) Foreign Application Priority Data
Nov. 15, 2012 (JP) .................................. 2012-250905

(51) Int. Cl.
*C22C 21/02* (2006.01)
*C22F 1/047* (2006.01)
(Continued)

(52) U.S. Cl.
CPC .............. *C22C 21/02* (2013.01); *C22C 21/00* (2013.01); *C22C 21/14* (2013.01); *H01M 2/0237* (2013.01); *H01M 2/0257* (2013.01)

(58) Field of Classification Search
CPC ............ C22C 21/00–21/18; C22F 1/04–1/186
See application file for complete search history.

(56) References Cited

U.S. PATENT DOCUMENTS 5,779,824 A * 7/1998 Sawada ................... C22C 21/00
148/437
8,413,876 B2    4/2013 Dulac et al.
(Continued)

FOREIGN PATENT DOCUMENTS

CN    1882407 A    12/2006
CN    101974709 A    2/2011
(Continued)

OTHER PUBLICATIONS

English Abstract of CN101974709, Publication Date: Feb. 16, 2011.
(Continued)

*Primary Examiner* — Lois Zheng
(74) *Attorney, Agent, or Firm* — Millen, White, Zelano and Branigan, P.C.

(57) ABSTRACT

Provided is a 1000-series aluminum alloy plate which has high strength applicable to large-size lithium ion battery cases and also has excellent moldability and excellent laser weldability. An aluminum alloy plate produced from a DC cast slab. The aluminum alloy plate has such a chemical composition comprising 0.01 to 0.4 mass % of Si, 0.01 to 0.5 mass % of Fe, 0.002 to 0.3 mass % of Co and a remainder made up by Al and impurities, wherein the content of Cu, which is contained as an impurity, is limited to less than 0.2 mass %. The aluminum alloy plate has a metallic structure in which the number of second phase particles each having an equivalent circle diameter of 3 μm or more is 110
(Continued)

particles/mm² or more and less than 1000 particles/mm². A cold-rolled and annealed plate produced from the aluminum alloy plate has an elongation value of 30% or more.

2 Claims, 2 Drawing Sheets

(51) Int. Cl.
*C22C 21/00* (2006.01)
*C22C 21/14* (2006.01)
*H01M 2/02* (2006.01)

(56) References Cited

U.S. PATENT DOCUMENTS

| | | | |
|---|---|---|---|
| 2003/0124364 A1* | 7/2003 | Sawada | B41N 1/083 428/472.2 |
| 2007/0099023 A1 | 5/2007 | Dulac et al. | |
| 2011/0315748 A1 | 12/2011 | Dulac et al. | |

FOREIGN PATENT DOCUMENTS

| | | |
|---|---|---|
| JP | 4926804 B1 | 7/1974 |
| JP | S55018537 A | 2/1980 |
| JP | 4218636 A | 8/1992 |
| JP | H11269591 A | 10/1999 |
| JP | 4001007 | 8/2007 |
| JP | 2009127075 | 6/2009 |
| JP | 2009256754 A | 11/2009 |
| JP | 2010126804 | 6/2010 |
| WO | 2012169412 A1 | 12/2012 |

OTHER PUBLICATIONS

English Abstract of JPH11269591, Publication Date: Oct. 5, 1999.
English Abstract of JPS55018537, Publication Date: Feb. 8, 1980.
International Search Report for PCT/JP2013/069678 dated Sep. 10, 2013.
English Abstract of WO2012169412, Publication Date: Dec. 13, 2012.
English Abstract of JP2009256754, Publication Date: Nov. 5, 2009.
English Abstract of JP4926804, Publication Date: May 9, 2012.
English Abstract of JP04218636, Publication Date: Aug. 10, 1992.
English Abstract of JP4001007, Publication Date: Jul. 15, 2004.
English Abstract of JP2010126804, Publication Date: Jun. 10, 2010.
English Abstract of JP2009127075, Publication Date: Jun. 11, 2009.

* cited by examiner

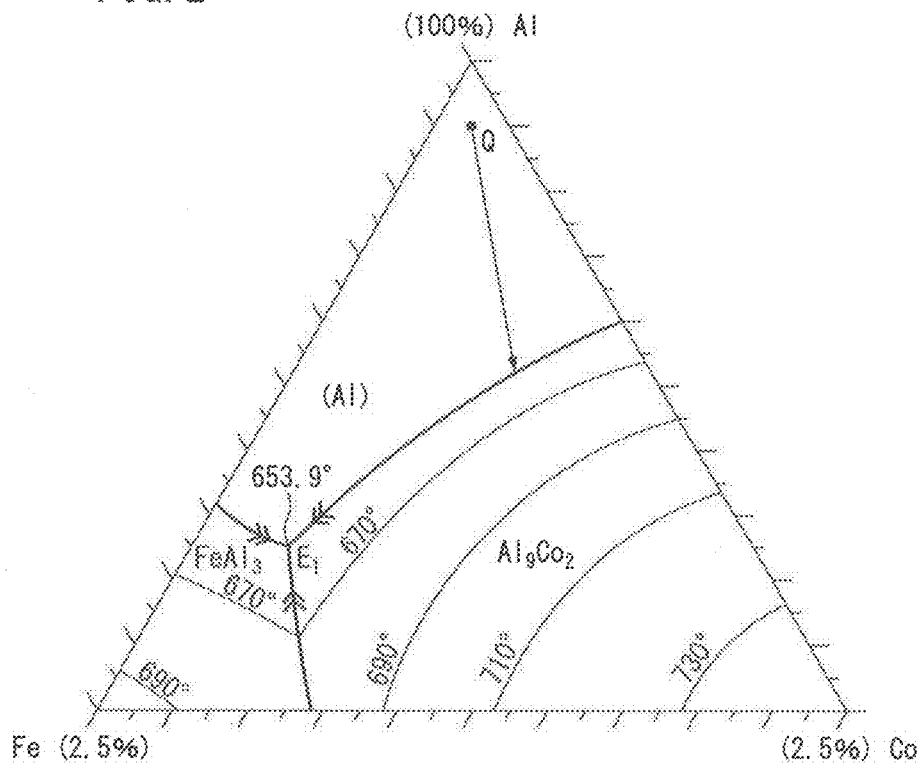

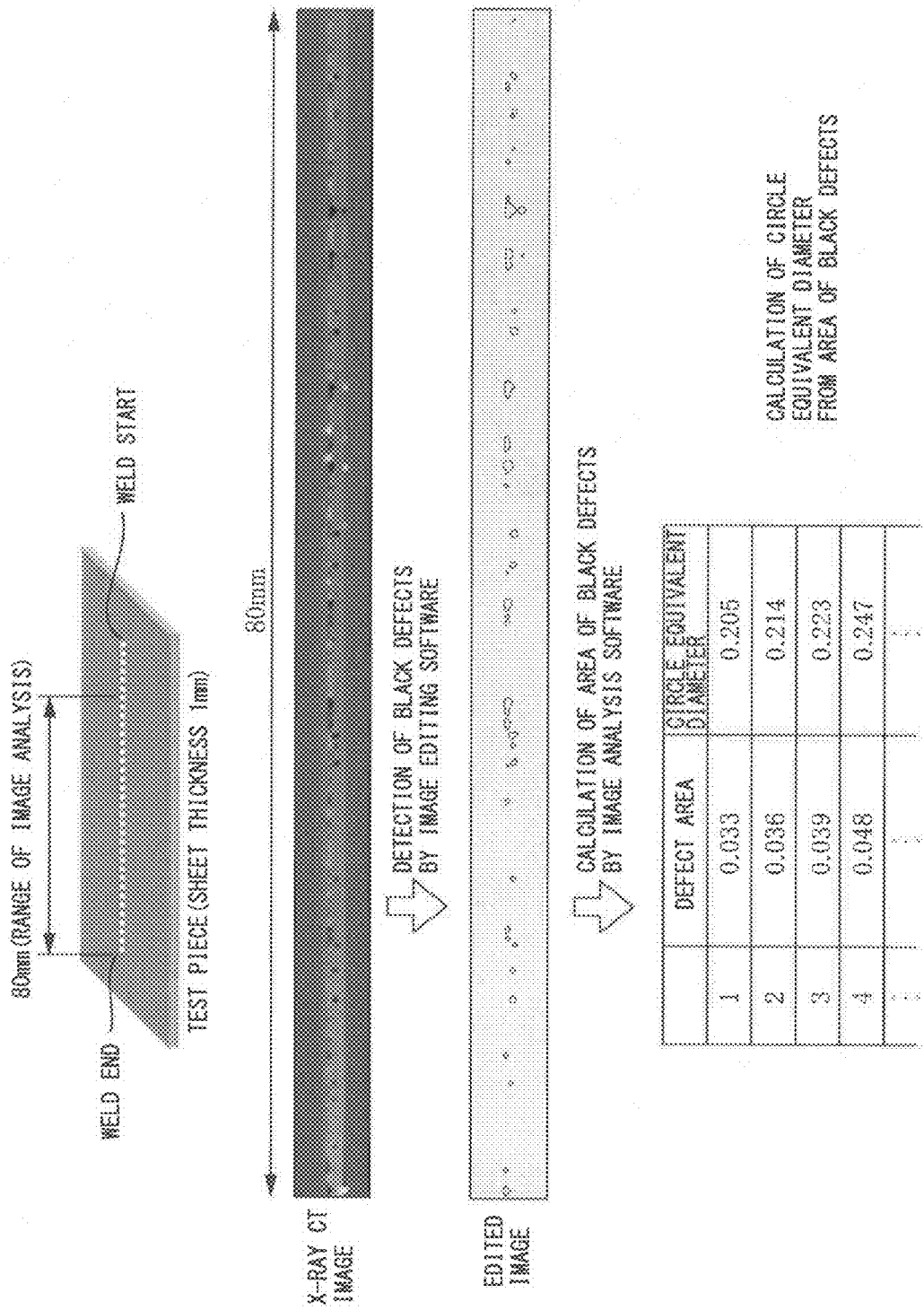

ALUMINUM ALLOY PLATE FOR BATTERY CASES, WHICH HAS EXCELLENT MOLDABILITY AND WELDABILITY

TECHNICAL FIELD

The present invention relates to high strength aluminum alloy sheet excellent in formability and laser weldability which is used for the case of a lithium ion battery or other secondary battery.

BACKGROUND ART

An Al—Mn-based 3000-series alloy is relatively excellent in strength, formability, and laser weldability, so is used as a material when producing a case for a lithium ion battery or other secondary battery. It is formed into a desired shape, then is sealed air-tightly by laser welding for use as a case for a secondary battery. Along with the 3000-series alloy, aluminum alloy sheet for secondary battery case use which is based on an existing 3000-series alloy and is further improved in strength and formability has also been developed.

For example, PLT 1 describes aluminum alloy sheet for rectangular cross-section battery case use characterized by containing, as the composition of the aluminum alloy sheet, Si: 0.10 to 0.60 mass %, Fe: 0.20 to 0.60 mass %, Cu: 0.10 to 0.70 mass %, Mn: 0.60 to 1.50 mass %, Mg: 0.20 to 1.20 mass %, Zr: over 0.12 to less than 0.20 mass %, Ti: 0.05 to 0.25 mass %, and B: 0.0010 to 0.02 mass % and a balance of Al and unavoidable impurities and by having a 45° edge rate of 4 to 7% with respect to the rolling direction by the cylindrical container deep drawing method.

On the other hand, recently, aluminum alloy sheet for rectangular cross-section battery case use characterized by having sufficient strength, drawing and ironing ability, and creep characteristics as a battery case, being excellent in laser weldability, and being able to suppress the increase in case thickness at the time of a charging and discharging cycle has also been developed. PLT 2 describes aluminum alloy sheet for rectangular cross-section battery case use characterized by containing a composition of Mn: 0.8 mass % or more, 1.8 mass % or more, Mg: over 0.6 mass % to 1.2 mass %, and Cu: over 0.5 mass % to 1.5 mass %, restricted in impurities to Fe: 0.5 mass % or more and Si: 0.3 mass % or more, having a balance of Al and unavoidable impurities, having a ratio (C/S) of orientation density C of the {001}<100> orientation and orientation density S of the {123}<634> orientation of 0.65 to 1.5, further having a tensile strength after final cold rolling of 250 MPa to 330 MPa, and having an elongation of 1% or more.

However, with an aluminum alloy sheet based on a 3000-series alloy but improved in composition, sometimes abnormal beads are formed. It is known that there is a problem in laser weldability. Therefore, aluminum alloy sheet for secondary battery use which is excellent in laser weldability has also been developed based on the 1000 series. PLT 3 describes an aluminum alloy material for pulse laser welding use which is comprised of an A1000-series aluminum material which is prevented from formation of abnormal parts by pulse laser welding and which enables the formation of a uniform, good weld zone and describes a battery case made of the same. According to this, the Ti which was added to suppress the coarsening of crystal grains in the casting process in the past has a detrimental effect on the weld zone and to prevent the formation of abnormal parts when welding A1000-series aluminum using pulse laser welding, the Ti which is contained in pure aluminum should be restricted to less than 0.01 mass %.

Further, PLT 4 describes aluminum alloy sheet which is excellent in laser weldability, particularly is free of uneven beads, when laser welding an A1000-series aluminum material. According to this, it is sufficient to provide aluminum alloy sheet which contains Si: 0.02 to 0.10 mass %, restricts the Fe content to 0.30 mass % or more, is comprised of a balance of Al and unavoidable impurities, and restricts the number of intermetallic compound particles with a circle equivalent diameter of 1.5 to 6.5 $\mu$m to 1000 to 2400/mm$^2$.

CITATIONS LIST

Patent Literature

PLT 1: Japanese Patent No. 4001007B
PLT 2: Japanese Patent Publication No. 2010-126804A
PLT 3: Japanese Patent Publication No. 2009-127075A
PLT 4: Japanese Patent Publication No. 2009-256754A

SUMMARY OF INVENTION

Technical Problem

It is true that, with the 1000 series, the value of elongation is high, the formability is excellent, and the number of abnormal beads in laser welding becomes smaller, so the weldability stabilizes. Therefore, with lithium ion batteries becoming larger in size, it is expected that higher strength characteristics will also be demanded and it is conceivable that the relatively thick 1000-series aluminum sheet materials will be applied as they are. In this regard, in recent years, the cases and lids made of aluminum alloy for lithium ion battery use have generally been joined by pulse laser welding. As explained above, in the relatively thick 1000-series sheet materials, the formability is excellent and the number of abnormal beads falls, but the heat conductivity also becomes good. For pulse laser welding, it is necessary to raise the energy per pulse etc. and weld under severe conditions. However, even in a 1000-series sheet material, if laser welding under such severe conditions, the weld beads suffer from undercuts, blowholes, and other such weld defects which in turn cause problems. The present invention was made so as to solve this problem and has as its object the provision of 1000-series aluminum alloy sheet which has a thickness enabling application to a large size lithium ion battery case and further which is excellent in formability and furthermore excellent in laser weldability.

Solution to Problem

The aluminum alloy sheet for battery case use excellent in formability and weldability of the present invention, to achieve this object, provides aluminum alloy sheet which is produced from a DC cast slab characterized by having a chemical composition which contains Si: 0.01 to 0.4 mass %, Fe: 0.01 to 0.5 mass %, and Co: 0.002 to 0.3 mass %, has a balance of Al and impurities, and is restricted in Cu as an impurity to less than 0.2 mass % and by having a metal structure with a number of second phase particles with a circle equivalent diameter of 3 $\mu$m or more of 110/mm$^2$ to less than 1000/mm$^2$. One which exhibits a 30% or more value of elongation is preferable.

Advantageous Effects of Invention

The aluminum alloy sheet of the present invention has a high heat conductivity, is excellent in formability, and further is provided with excellent laser weldability, so it is possible to produce a case for secondary battery use which is excellent in sealing ability.

BRIEF DESCRIPTION OF DRAWINGS

FIG. 1 is a diagram of an Al—Co—Fe reaction.

FIG. 2 is a phase diagram of an Al—Co—Fe-based ternary system (viewed from liquidus surface).

FIG. 3 is a conceptual view which explains a method of measurement/evaluation of the number of weld defects.

DESCRIPTION OF EMBODIMENTS

A secondary battery is produced by inserting electrode members into a case, then welding it etc. to attach a lid and seal it. If using such a secondary battery for a portable telephone etc., when charging it, the temperature inside of the case rises and the pressure inside of the case sometimes increases. For this reason, there is the problem that if the strength of the material used to make the case is low, large swelling will occur at the produced case. Therefore, when selecting 1000-series aluminum alloy sheet as the material used, it is necessary to design a relatively thick case. Further, as the method of making the case, the press-forming method is generally used, so an excellent press formability is demanded from the material itself used.

Further, as the method of attaching the lid to seal the case, the welding method is used, so excellent weldability is also demanded. Further, as the welding method when producing a case for secondary battery use, the laser welding method is often used. In this regard, regarding the laser weldability, (1) the stability of the width of the weld beads and stability of the depth of welds and (2) the suppression of undercuts, blowholes, and other weld defects at the weld beads may be mentioned as issues. In general, if using 1000-series aluminum alloy sheet as the material of the case, it is learned that the width of the weld beads stabilizes and the undercuts, blowholes, and other weld defects at the weld beads become smaller in number. Further, 1000-series aluminum alloy sheet is excellent in thermal conductivity, so to weld a thick material by pulse laser welding, the energy per pulse has to be made higher and otherwise tough conditions must be used for welding.

By such irradiation by a pulse laser, it is believed that the surface temperature of the weld beads during the joining operation locally reaches a 2000° C. or more high temperature. Aluminum is considered to be a highly reflective material and is considered to reflect about 70% of a laser beam. On the other hand, the second phase particles which are present near the surface of the aluminum alloy sheet, for example, $Al_3Fe$, Al—Fe—Si, and other intermetallic compounds, have a smaller specific heat and thermal conductivity compared with the aluminum of the matrix even at room temperature and preferentially rise in temperature. The thermal conductivity of the intermetallic compounds becomes further lower along with a rise of temperature. The light absorption rate rises in an accelerated manner whereby only the intermetallic compounds rapidly are heated and melt. The pulse irradiation time per pulse of the pulse laser is an extremely short time of nanoseconds and femtoseconds. Therefore, around when the α-Al of the matrix melts and changes in phase to a liquid phase, $Al_3Fe$, Al—Fe—Si, and other intermetallic compounds first reach the boiling point and evaporate, so rapidly cause the volume to expand.

Due to such local evaporation of intermetallic compounds, weld defects called undercuts and blowholes occur at the weld beads whereby a drop in the air-tightness of the case is liable to occur. Therefore, the inventors etc. engaged in intensive studies based on the above such mechanism of formation of undercuts and blowholes. As a result, they pinpointed the fact that the cause was the intermetallic compounds which were formed when casting the original slab of the 1000-series aluminum alloy sheet and succeeded in remarkably lowering the number of weld defects at the weld beads by making the composition one based on the 1000-series aluminum alloy and further including Co: 0.002 to 0.3 mass % and thereby completed the present invention.

The inventors etc. engaged in in-depth studies to obtain aluminum alloy sheet which is excellent in press formability and which is excellent also in laser weldability through investigation of the number of undercuts, blowholes, etc. which formed in the weld zone and thereby completed the present invention. Below, the content will be explained.

First, the effect of the elements included in the aluminum alloy sheet for secondary battery case use of the present invention, their suitable contents, etc. will be explained.

Fe: 0.01 to 0.5 Mass %

Fe is an element which forms the intermetallic compounds $Al_3Fe$ and Al—Fe—Si, so to reduce the weld defects, it is desirable to reduce the content as much as possible. However, if the Fe content is less than 0.01 mass %, high purity aluminum ingots have to be used and an increase in cost is unavoidable, so this is not preferable. If the Fe content is over 0.5 mass %, at the time of DC slab casting, coarse intermetallic compounds of $Al_3Fe$ precipitate, the formability at the final sheet falls, the intermetallic compounds easily evaporate compared with the Al matrix at the time of laser welding, the number of undercuts, blowholes, and other weld defects increases, and the weldability falls, so this is not preferable. Therefore, the Fe content is made 0.01 to 0.5 mass % in range. The more preferable Fe content is 0.02 to 0.5 mass % in range. The still more preferable Fe content is 0.02 to 0.48 mass % in range.

Si: 0.01 to 0.4 Mass %

Si is an element which causes a drop in the formability and an element which easily precipitates as crystals at the grain boundaries as Si alone and promotes the precipitation of Al—Fe—Si at the time of DC slab casting. Therefore, to reduce the weld defects, it is desirable to reduce its content as much as possible. However, if the Si content is less than 0.01 mass %, this means use of high purity aluminum ingots. An increase in cost is unavoidable, so this is not preferable. If the Si content is over 0.4 mass %, at the time of DC slab casting, coarse intermetallic compounds of Al—Fe—Si precipitate, the formability at the final sheet falls, the intermetallic compounds easily evaporate compared with the Al matrix at the time of laser welding, the number of undercuts, blowholes, and other weld defects increases, and the weldability falls, so this is not preferable. Therefore, the Si content is made 0.01 to 0.4 mass % in range. The more preferable Si content is 0.02 to 0.4 mass % in range. The still more preferable Si content is 0.02 to 0.38 mass % in range.

Co: 0.002 to 0.3 mass %

Co is an extremely important element for forming clusters of extremely fine eutectic $Al_9Co_2$ in the liquid phase of the slab being solidified. Within the suitable range of initial ratio of concentration of Co/Fe, clusters of eutectic $Al_9Co_2$ form before eutectic $Al_3Fe$ precipitates and are believed to act as nuclei for eutectic $Al_3Fe$. For this reason, if within the suitable range of initial ratio of concentration of Co/Fe, Co has the effect of making the sites of precipitation of eutectic $Al_3Fe$ increase to refine the eutectic $Al_3Fe$ irrespective of the cooling speed at the time of solidification. If the Co content is less than 0.002 mass %, the above effect is not exhibited. If the Co content is over 0.3 mass %, the production cost just increases, so this is not preferable. Therefore, the Co content is made 0.002 to 0.3 mass % in range. The more preferable Co content is 0.003 to 0.3 mass % in range. The still more preferable Co content is 0.005 to 0.1 mass % in range.

First, the inventors etc. hypothesized that since the transition metal Co is higher in boiling point than Al, by including Co in the 1000-series aluminum alloy, for example, the transition element of Fe in the $Al_3Fe$, Al—Fe—Si, and other intermetallic compounds would be interstitially substituted by Co and new intermetallic compounds would be formed as a metastable phase. Further, they believed that the new intermetallic compounds which remained at the final sheet would be high in boiling point and would be hard to vaporize at the time of laser welding. However, the results of identification of the intermetallic compounds by X-ray diffraction at the final sheet completely denied this hypotheses.

Next, the mechanism which the inventors etc. considered most probable at the present time will be explained. First, consider the diagram of the Al—Co—Fe reaction which is shown in FIG. 1. In this reaction diagram, it is shown that the precipitates which can form in the liquid phase Al—Co—Fe alloy melt, while depending on the Co concentration and the Fe concentration, are $Al_3Fe$ and $Al_9Co_2$. Of course, the Al alloy composition of the present invention is a hypoeutectic component for both Co and Fe, so at the initial stage of casting and solidification, α-Al precipitates as the primary crystal.

In this regard, the eutectic temperature at an Al—Co-based binary alloy system is 657° C., while the eutectic temperature at an Al—Fe-based binary alloy system is 655° C. Here, to simplify the explanation, the mode of phase change of an Al—Co—Fe-based trinary alloy will be considered without considering the effect of Si and other elements. FIG. 2 shows the liquid phase surface of an Al—Co—Fe-based trinary system. Accurate prediction is difficult, but the point is that if a quasi-equilibrium state, if the Al—Co—Fe alloy melt of the composition Q is cooled and becomes lower in temperature than the Al liquidus surface, α-Al of a corresponding composition at the Al solidus surface will precipitate, and the composition at the liquid phase side will change along with the drop of temperature on the Al liquidus surface for example along the arrow mark and cross the Al—Co eutectic line.

That is, a eutectic reaction such as $Al(L) \rightarrow$ eutectic $Al+Al_9Co_2$ occurs and a eutectic composition which is comprised of eutectic Al and $Al_9Co_2$ is formed. Due to this eutectic reaction, latent heat of solidification occurs, but according to the phase rule, at atmospheric pressure (in case of constant pressure), the degree of freedom (F=C−P+1) is F=1 since C=3 and P=3. The temperature of this region is not constant, but the temperature changes. Until this eutectic reaction ends, the composition of this region changes along the eutectic line and the temperature gradually falls. Of course, in the actual solidification process, since it is a nonequilibrium process, supercooling results. The path of the liquid phase (composition and temperature) passes through the lower side (low temperature side) from the Al liquidus surface at the equilibrium diagram and reaches the lower side from the eutectic line (low temperature side) where a eutectic reaction such as $Al(L) \rightarrow$ eutectic $Al+Al_9Co_2$ occurs.

The point to note is that, in particular right under the precipitation temperature of the primary α-Al, the solid solubility limit of Co in the α-Al phase is smaller than the solid solubility limit of Fe in the α-Al phase. That is, the equilibrium distribution coefficient of Co ($k=C_S/C_L$) at the solid-liquid interface of the Al—Co—Fe alloy melt is smaller than the equilibrium distribution coefficient of Fe, so even if a nonequilibrium state, condensation of Co at the liquid phase is believed to proceed faster than condensation of Fe. As a result, compared with the initial concentration ratio of Co/Fe in the liquid phase, the concentration ratio of Co/Fe in the liquid phase after the primary α-Al precipitates is believed to become higher.

Therefore, in the composition Q in FIG. 2, the case of an initial ratio of concentration of Co/Fe of 1 is schematically shown, but even in the case of an initial ratio of concentration of Co/Fe smaller than 1, for example, 0.05, the ratio of concentration of Co/Fe in the liquid phase after the primary α-Al precipitates gradually becomes higher while the (composition and temperature) of the liquid phase reaches the lower side of the eutectic line ($Al(L) \rightarrow$ eutectic $Al+Al_9Co_2$) (low temperature side). In other words, even in a state of the same supercooling, eutectic $Al_9Co_2$ precipitates before the eutectic $Al_3Fe$.

In this regard, eutectic $Al_9Co_2$ is believed to form extremely fine clusters at the start of formation. When such fine clusters of eutectic $Al_9Co_2$ are present in the liquid phase during cooling, depending on the ratio of concentration of Co/Fe in the liquid phase, these clusters can become nuclei for eutectic $Al_3Fe$. Therefore, the formation of clusters of fine eutectic $Al_9Co_2$ first in the supercooled state means the homogeneous nucleation for eutectic $Al_9Co_2$ and in some cases means the inhomogeneous (heterogeneous) nucleation for eutectic $Al_3Fe$. Of course, as shown in FIG. 2, when the initial ratio of concentration of Co/Fe is 1, the ratio of concentration of Co/Fe in the liquid phase becomes higher than 1, precipitation of eutectic $Al_3Fe$ may be suppressed thermodynamically, and the clusters of eutectic $Al_9Co_2$ which are formed in the liquid phase may act as homogeneous nuclei. Whatever the case, the clusters of fine eutectic $Al_9Co_2$ in the liquid phase are formed uniformly and in a high density, so in the suitable range of initial ratio of concentration of Co/Fe, the clusters will form nuclei for precipitation of eutectic $Al_3Fe$ and as a result the eutectic $Al_3Fe$ will be refined. In other words, Co can serve as a refining agent for eutectic $Al_3Fe$.

The above is the mechanism for suppressing precipitation and refining eutectic $Al_3Fe$ in the presence of Co. Further, the inventors etc. believed that eutectic $Al_9Co_2$ is far finer than eutectic $Al_3Fe$, is difficult to evaporate at the time of laser welding, and hardly ever causes weld defects. In the range of alloy composition of the present invention, by including 0.002 to 0.3 mass % of Co, it becomes possible to achieve both suppression of precipitation and refinement of eutectic $Al_3Fe$ and possible to reduce undercuts, blowholes, and other weld defects at the weld beads of laser welding.

Cu as Unavoidable Impurity: Less than 0.2 Mass %

Cu may be contained in less than 0.2 mass % as an impurity. In the present invention, if the Cu content is less than 0.2 mass % in range, the formability and laser weldability and other characteristics will not fall. If the Cu content is 0.2 mass % or more, the number of weld defects at the time of laser welding increases and the weldability falls, so this is not preferable.

Other Unavoidable Impurities

Unavoidable impurities unavoidably enter from the starting metal ingots, recycled materials, etc. The allowable contents of these, for example, were Ni, Mo, and Zr: less than 0.1 mass % each, Mn, Mg, Zn, Ti, B, Ga, and V: less than 0.01 mass %, Pb, Bi, Sn, Na, Ca, Sr, and Nb: less 0.005 mass % each, and others: less than 0.02 mass % each. Even if containing unmanaged elements in this range, the effects of the present invention are not inhibited.

Number of Second Phase Particles with Circle Equivalent Diameters of 3 μm or More in Metal Structure of 110/Mm² to Less than 1000/Mm²

In order to reduce the undercuts, blowholes, and other weld defects in the weld beads of the laser welding, it is necessary that the number of second phase particles with a circle equivalent diameter of 3 μm or more in the metal structure of the final sheet which was produced from a DC cast slab be 110/mm² to less than 1000/mm². If having such a metal structure, viewed probability wise, the density of the relatively coarse $Al_3Fe$ or other intermetallic compounds becomes lower and the undercuts, blowholes, and other weld defects at the weld beads of the laser welding can be reduced. In the range of alloy composition of the present invention, by basing the composition on a 1000-series aluminum alloy and further including Co: 0.002 to 0.3 mass %, it becomes possible to achieve finer eutectic $Al_3Fe$ and becomes possible to make the number of second phase particles with a circle equivalent diameter of 3 μm or more in the metal structure of the final sheet which is produced from a DC cast slab 110/mm² to less than 1000/mm².

Cold Rolled Annealed Material: Value of Elongation of 30% or More

In this regard, in applying 1000-series aluminum alloy sheet to a large-sized lithium ion battery case etc., it is necessary to not only have excellent laser weldability, but also to be excellent in formability. It is possible to learn the formability of a material by the value of the elongation at the time of a tensile test. Details will be left for the explanations of the later examples. As the 1000-series aluminum alloy sheet of the present invention which is applied to a large-size lithium ion battery case etc., one which has a characteristic of a value of elongation of 30% or more is preferable.

Next, the method of production of aluminum alloy sheet for secondary battery case use will be simply explained.

Melting/Smelting

The material is charged into a melting furnace. When reaching a predetermined melting temperature, flux is suitably added and the mixture stirred. In accordance with need, a lance etc. is used to degas the inside of the furnace, then the melt is held to settle and the slag is separated from the melt surface. With this melting and refining, to obtain a predetermined alloy composition, it is important to again charge the master alloy and other raw materials again, but it is extremely important to take a sufficient settling time until the flux and slag float up to the melt surface from the aluminum alloy melt and is separated. The settling time is preferably usually 30 minutes or more.

The aluminum alloy melt which is refined in the melting furnace is sometimes transferred once to a holding furnace, then is cast, but is sometimes tapped directly from the melting furnace and cast. The more preferable settling time is 45 minutes or more. In accordance with need, the material may be passed through an inline degassing and filter process. The inline degassing is usually of a type which blows inert gas etc. from a rotary degasser to the aluminum melt and makes the hydrogen gas in the melt diffuse in the bubbles of the inert gas to remove it. When using inert gas constituted by nitrogen gas, it is important to manage the dew point at for example −60° C. or less. The amount of hydrogen gas of the ingot is preferably reduced to 0.20 cc/100 g or less.

When the amount of hydrogen gas of the ingot is large, porosity forms in the final solidified part of the ingot, so the reduction rate per pass in the hot rolling process has to be restricted to for example 7% or more to crush the porosity. Further, the hydrogen gas which forms a solid solution in a supersaturated state in the ingot, while depending on the conditions of the homogenization treatment before the hot rolling process, sometimes precipitates at the time of laser welding after forming the final sheet so as to cause formation of a large number of blowholes in the beads. For this reason, the more preferable amount of hydrogen gas of the ingot is 0.15 cc/100 g or less.

Casting

The ingot is produced by semicontinuous casting (DC casting). In the case of usual semicontinuous casting, the ingot generally has a thickness of 400 to 600 mm or so, therefore the solidification cooling rate at the ingot center is 1° C./sec or so. For this reason, in particular when semi-continuously casting an aluminum alloy melt with high Fe and Si contents, there is a tendency for the Al—Fe—Si and other relatively coarse intermetallic compounds to precipitate from the aluminum alloy melt in the center of the ingot.

The casting speed in semicontinuous casting depends on the width and thickness of the cast ingot, but usually, considering the productivity as well, is 50 to 70 mm/min. However, when performing in-line degassing, if considering the actual residence time of the melt in the degassing treatment tank, while depending on the flow rate of the inert gas and other gas conditions, the smaller the flow rate of the aluminum melt (feed of melt per unit time), the better the degassing efficiency in the tank and the more the amount of hydrogen gas of the ingot can be reduced. While depending also on the number of molds in the casting etc., to reduce the amount of hydrogen gas of the cast slab, the casting speed is preferably restricted to 30 to 50 mm/min. The more desirable casting speed is 30 to 40 mm/min. Of course, if the casting speed is less than 30 mm/min, the productivity falls, so this is not preferable.

Homogenization Treatment: 420 to 620° C.×1 Hour or More

The ingot which is obtained by casting by the semicontinuous casting method is treated for homogenization. The homogenization treatment is treatment holding the ingot at a high temperature to facilitate rolling and eliminating the casting segregation and residual stress in the cast ingot. In the present invention, the ingot is held at a holding temperature of 420 to 620° C. for 1 hour or more. In this case, this is also treatment for making the transition elements etc. which form the intermetallic compounds which precipitate at the time of casting form a certain extent of solid solution in the matrix. If this holding temperature is too low or the holding temperature is short, the above transition elements etc. do not sufficiently form a solid solution, the recrystallized crystal grains become coarser, and the outer skin after drawing and ironing is liable not to be finished beautifully. Further, if the holding temperature is too high, while depending on the amount of hydrogen of the ingot, a blister is liable to occur. The more preferable homogenization treatment temperature is 420 to 600° C.

Hot Rolling Step

The ingot which is held at a high temperature for a predetermined time is hoisted from a crane as is after the homogenization treatment and carried to the hot rolling mill. Depending on the type of the hot rolling mill, it is usually hot rolled by several rolling passes and is wound in a coil as a hot rolled sheet of a predetermined thickness, for example 4 to 8 mm or so.

Cold Rolling Step

The coil which is obtained by taking up the hot rolled sheet is run through a cold rolling mill and usually cold rolled by several passes. At this time, work hardening occurs due to the plastic strain which is introduced due to the cold rolling, so process annealing is performed in accordance with need. Usually the process annealing is softening treatment as well, so while depending on the material, the cold rolled coil may be inserted into a batch furnace and held there at a 300 to 450° C. temperature for 1 hour or more. If the holding temperature is lower than 300° C., softening does not progress, while if the holding temperature exceeds 450° C., an increase in the cost of treatment is liable to occur. Further, the process annealing can also serve as the solution treatment if using a continuous annealing furnace to hold the material at for example 400° C. to 550° C. in temperature for within 15 seconds and then rapidly cooling. If the holding temperature is lower than 400° C., softening does not proceed, while if the holding temperature is over 550° C., a blister is liable to occur.

Final Annealing

In the present invention, the final annealing which is performed after the final cold rolling may, for example, be batch treatment which uses the annealing furnace to hold the material at a temperature of 300 to 500° C. for 1 hour or more, but if using a continuous annealing furnace to for example hold the material at 400° C. to 550° C. in temperature for 15 seconds or less, then rapidly cool it, this may also serve as a solution treatment. In either case, in the present invention, final annealing is not necessarily essential, but if considering the formability in usual drawing and ironing, the final sheet desirably has a certain extent of elongation. If considering the formability in the mold-making process, it is desirable to make the material an annealed material or solubilized material. When mechanical strength is given priority over formability, the material is provided in the cold rolled state.

Final Cold Rolling Rate

The final cold rolling rate in the case of performing final annealing is preferably 50 to 90% in range. If the final cold rolling rate is in this range, it is possible to make the average size of the recrystallized grains in the final sheet after annealing 20 to 100 μm and make the value of elongation 30% or more and possible to beautifully finish the outer skin after shaping. The more preferable final cold rolling rate is 60 to 90% in range. On the other hand, the final cold rolling rate when leaving the material as cold rolled without final annealing is preferably 5 to 40% in range. At the time of drawing and ironing, when the amount of ironing becomes greater, it is necessary to provide a final sheet somewhat harder than the annealed material. The more preferable final cold rolling rate is 10 to 30% in range. By going through the above such usual processes, aluminum alloy sheet for secondary battery case use can be obtained.

The examples explained below are comprised of "examples using permanent mold cast materials" and "examples using DC cast materials". Here, the final sheets (test materials) obtained by the two examples were evaluated for formability and laser weldability and measured for number of second phase particles. For evaluation of the formability and laser weldability, it was presumed that the results of evaluation obtained by two examples would match. However, a DC cast slab and a permanent mold cast slab greatly differ in dimensions, so, for example, the solidification and cooling speed at the center part of the slabs also differ. There is a great difference in the sizes of the second phase particles at the metal structures of the final sheets. As explained above, the aluminum alloy sheet of the present invention covers the cold rolled sheet and cold rolled annealed sheet which is produced from a DC cast slab through an ordinary process. Therefore, the suitable scope of the chemical composition which was defined in the claims was determined based on the "examples using permanent mold cast materials", while the suitable scope of the metal structure was determined based on the "examples using DC cast materials".

EXAMPLES

Examples Using Mold Cast Materials

Preparation of Final Sheet

Predetermined types of ingots were weighed and mixed and charged into #20 crucibles coated with a parting agent in amounts of 6 kg at a time (total eight test materials). These crucibles were inserted into an electric furnace where the contents were melted at 780° C. and deslagged, then the melt temperatures were held at 760° C. and lances were inserted into the melts to blow in $N_2$ gas at a flow rate of 1.0 liter/min for 10 minutes for degassing treatment. After that, the melts were allowed to settle for 30 minutes, then the slags which floated up to the melt surface were removed and the melts were sampled by spoons in casting molds for analysis of composition to obtain disk samples. Next, fixtures were used to successively take out the crucibles from the electric furnace and cast aluminum melts into preheated permanent molds (250 mm×200 mm×30 mm). Disk samples of the test materials were analyzed for composition by emission spectrophotometric analysis. The results are shown in Table 1 and Table 2.

TABLE 1

Chemical Composition of Test Materials (Examples)

| Test Material No. | Chemical composition (mass %) | | | | | | | | |
|---|---|---|---|---|---|---|---|---|---|
| | Si | Fe | Cu | Mn | Mg | Zn | Ti | B | Co |
| Ex. 1 | 0.01 | 0.01 | <0.01 | <0.01 | <0.01 | <0.01 | <0.01 | <0.01 | 0.051 |
| Ex. 2 | 0.01 | 0.01 | <0.01 | <0.01 | <0.01 | <0.01 | <0.01 | <0.01 | 0.31 |
| Ex. 3 | 0.06 | 0.45 | <0.01 | <0.01 | <0.01 | <0.01 | <0.01 | <0.01 | 0.005 |
| Ex. 4 | 0.06 | 0.30 | <0.01 | <0.01 | <0.01 | <0.01 | <0.01 | <0.01 | 0.007 |
| Ex. 5 | 0.06 | 0.31 | <0.01 | <0.01 | <0.01 | <0.01 | <0.01 | <0.01 | 0.051 |
| Ex. 6 | 0.06 | 0.41 | <0.01 | <0.01 | <0.01 | <0.01 | <0.01 | <0.01 | 0.31 |
| Ex. 7 | 0.36 | 0.31 | <0.01 | <0.01 | <0.01 | <0.01 | <0.01 | <0.01 | 0.29 |
| Ex. 8 | 0.01 | 0.40 | 0.03 | <0.01 | <0.01 | <0.01 | <0.01 | <0.01 | 0.12 |
| Ex. 9 | 0.38 | 0.46 | 0.14 | <0.01 | <0.01 | <0.01 | <0.01 | <0.01 | 0.025 |
| Ex. 10 | 0.21 | 0.01 | 0.15 | <0.01 | <0.01 | <0.01 | <0.01 | <0.01 | 0.031 |
| Ex. 11 | 0.16 | 0.30 | 0.19 | <0.01 | <0.01 | <0.01 | <0.01 | <0.01 | 0.29 |
| Ex. 12 | 0.06 | 0.35 | 0.01 | <0.01 | <0.01 | <0.01 | <0.01 | <0.01 | 0.06 |
| Ex. 13 | 0.06 | 0.30 | 0.05 | <0.01 | <0.01 | <0.01 | <0.01 | <0.01 | 0.011 |

TABLE 2

Chemical Composition of Test Materials (Comparative Examples)

| Test Material No. | Si | Fe | Cu | Mn | Mg | Zn | Ti | B | Co |
|---|---|---|---|---|---|---|---|---|---|
| Comp. Ex. 1 | 0.06 | 0.30 | <0.01 | <0.01 | <0.01 | <0.01 | <0.01 | <0.01 | ≤0.001 |
| Comp. Ex. 2 | 0.06 | 0.30 | <0.01 | <0.01 | <0.01 | <0.01 | <0.01 | <0.01 | ≤0.001 |

TABLE 2-continued

Chemical Composition of Test Materials (Comparative Examples)

| Test Material No. | Si | Fe | Cu | Mn | Mg | Zn | Ti | B | Co |
|---|---|---|---|---|---|---|---|---|---|
| Comp. Ex. 3 | 0.06 | 0.30 | <0.01 | <0.01 | <0.01 | <0.01 | <0.01 | <0.01 | <u><0.001</u> |
| Comp. Ex. 4 | 0.01 | <u>0.70</u> | <0.01 | <0.01 | <0.01 | <0.01 | <0.01 | <0.01 | 0.29 |
| Comp. Ex. 5 | <u>0.42</u> | 0.31 | <0.01 | <0.01 | <0.01 | <0.01 | <0.01 | <0.01 | 0.29 |
| Comp. Ex. 6 | 0.06 | 0.31 | 0.05 | <0.01 | <0.01 | <0.01 | <0.01 | <0.01 | <u><0.001</u> |
| Comp. Ex. 7 | 0.09 | 0.31 | 0.15 | <0.01 | <0.01 | <0.01 | <0.01 | <0.01 | <u><0.001</u> |
| Comp. Ex. 8 | 0.08 | 0.32 | 0.02 | <0.01 | <0.01 | <0.01 | <0.01 | <0.01 | <u><0.001</u> |
| Comp. Ex. 9 | 0.07 | <u>0.68</u> | 0.13 | <0.01 | <0.01 | <0.01 | <0.01 | <0.01 | 0.30 |
| Comp. Ex. 10 | <u>0.51</u> | 0.20 | 0.09 | <0.01 | <0.01 | <0.01 | <0.01 | <0.01 | 0.23 |
| Comp. Ex. 11 | 0.06 | 0.30 | <u>0.32</u> | <0.01 | <0.01 | <0.01 | <0.01 | <0.01 | 0.30 |
| Comp. Ex. 12 | 0.06 | 0.30 | <u>0.30</u> | <0.01 | <0.01 | <0.01 | <0.01 | <0.01 | 0.30 |
| Comp. Ex. 13 | 0.06 | 0.30 | <u>0.70</u> | <0.01 | <0.01 | <0.01 | <0.01 | <0.01 | 0.01 |

Note)
Analytical values shown by underlines mean outside scope of prescribed composition at elements.

The cast ingots were cut to remove the risers and were shaved at their two surfaces by 2 mm each to obtain a thickness of 26 mm. The cast ingots were inserted into an electric heating furnace where they were heated by a 100° C./hr heating rate to 430° C., were treated at 430° C.×1 hour for homogenization, then were hot rolled by a hot rolling mill to a 6 mm thickness. Next, the hot rolled sheets were cold rolled without process annealing so as to obtain 1 mm cold rolled sheets. The final cold reduction in this case was 83%. As this final annealing treatment, the cold rolled sheets were inserted into an annealer and annealed at 390° C.×1 hour, then the cold rolled sheets were taken out from the annealer and air cooled.

Next, the thus obtained final sheets (test materials) were evaluated for formability and laser weldability and measured for number of second phase particles.

Evaluation of Formability

The obtained final sheets were evaluated for formability by the elongation (%) in a tensile test. Specifically, JIS No. 5 test pieces were taken so that the tensile direction became parallel to the rolling direction, a tensile test was performed based on JIS Z 2241, and the tensile strength, 0.2% yield strength, and elongation (elongation at break) were found. In final sheets which were cold rolled, then annealed, test materials with a value of elongation of 30% or more were evaluated as "good" in formability, while test materials with a value of less than 30% were evaluated as "poor" in formability. The results of evaluation of the formability are shown in Table 3 and Table 4.

Laser Welding Conditions

The obtained final sheets were irradiated by a pulse laser to evaluate the laser weldability. A LUMONICS-made YAG laser welder JK701 was used to weld two sheets of the same test material abutting with no clearance between the end parts over the entire 100 mm length along that part by pulse laser welding under conditions of a frequency of 37.5 Hz, weld speed of 400 mm/min, energy per pulse of 9.0 J, pulse width of 1.5 msec, and shield gas (nitrogen) flow rate of 15 (liter/min).

Evaluation of Laser Weldability Measurement/Evaluation of Number of Weld Defects Next, as evaluation of the laser weldability, the number of weld defects which occurred at the weld zone were measured. First, in the above 100 mm length weld line, the region of the 80 mm length remaining after excluding the 20 mm length of weld line at the weld start part was determined as the measurement region. This was excluded since the part near the weld start was unstable. Further, as shown in FIG. 3, the cross-section of the weld beads which were formed along the 80 mm long weld line was examined by X-ray CT to obtain an X-ray CT image at the sheet thickness cross-section parallel to the weld line. Further, this X-ray CT image was used as the basis to detect black defects by image editing software, then image analysis software was used to calculate the area of the black defects. The numbers of particles which correspond to the circle equivalent diameters were calculated from the area of the black defects. In the examples using a permanent mold cast material, test materials with a number of black defects with a circle equivalent diameter of 0.4 mm or more of less than 10 were evaluated as "good" in number of weld defects, while test materials with a number of black defects with a circle equivalent diameter of 0.4 mm or more of 10 or more were evaluated as "poor" in number of weld defects. The results of evaluation of the laser weldability are shown in Table 3 and Table 4.

Measurement of Number of Second Phase Particles of Metal Structure

A vertical cross-section parallel to the rolling direction of the obtained final sheet (cross-section vertical to LT direction) was cut out, was buried in a thermoplastic resin, was polished to a mirror surface, and was etched by a hydrofluoric acid aqueous solution to examine the metal structure. The micro metal structure was photographed by an optical microscope (area per field: 0.0334 $mm^2$, 15 fields per sample photographed), the photograph was analyzed by image analysis, and the number of second phase particles with a circle equivalent diameter of 3 μm or more per unit area (1 $mm^2$) was measured. In the examples using the permanent mold cast material, when the number of second phase particles with a circle equivalent diameter of 3 μm or more is less than 100/$mm^2$, the material is evaluated as "good", while when the number of second phase particles with a circle equivalent diameter of 3 μm or more is 100/$mm^2$ or more, the material is evaluated as "poor". The results of image analysis are shown in Table 3 and Table 4.

TABLE 3

Results of Evaluation of Test Materials (Examples)

| Test Material No. | No. of weld defects (no.) | Tensile characteristics UTS (MPa) | YS (MPa) | Elongation (%) | Weldability (No. of defects) | Formability (Elongation) | No. of second phase particles with circle equivalent diameters of 3 μm or more (/mm²) |
|---|---|---|---|---|---|---|---|
| Ex. 1  | 3 | 56 | 20 | 42 | Good | Good | 12 |
| Ex. 2  | 1 | 67 | 21 | 41 | Good | Good | 24 |
| Ex. 3  | 4 | 74 | 27 | 45 | Good | Good | 87 |
| Ex. 4  | 0 | 75 | 26 | 44 | Good | Good | 56 |
| Ex. 5  | 2 | 71 | 26 | 37 | Good | Good | 22 |
| Ex. 6  | 1 | 83 | 30 | 38 | Good | Good | 40 |
| Ex. 7  | 4 | 85 | 32 | 43 | Good | Good | 96 |
| Ex. 8  | 3 | 82 | 30 | 40 | Good | Good | 42 |
| Ex. 9  | 8 | 96 | 35 | 44 | Good | Good | 20 |
| Ex. 10 | 9 | 74 | 23 | 44 | Good | Good | 31 |
| Ex. 11 | 9 | 94 | 33 | 36 | Good | Good | 61 |
| Ex. 12 | 5 | 78 | 28 | 42 | Good | Good | 31 |
| Ex. 13 | 7 | 77 | 27 | 43 | Good | Good | 69 |

TABLE 4

Results of Evaluation of Test Materials (Comparative Examples)

| Test Material No. | No. of weld defects (no.) | Tensile characteristics UTS (MPa) | YS (MPa) | Elongation (%) | Weldability (No. of defects) | Formability (Elongation) | No. of second phase particles with circle equivalent diameters of 3 μm or more (/mm²) |
|---|---|---|---|---|---|---|---|
| Comp. Ex. 1  | 12 | 74  | 26 | 37 | Poor | Good | 122 |
| Comp. Ex. 2  | 12 | 74  | 26 | 47 | Poor | Good | 125 |
| Comp. Ex. 3  | 11 | 73  | 26 | 48 | Poor | Good | 118 |
| Comp. Ex. 4  | 24 | 96  | 41 | 36 | Poor | Good | 170 |
| Comp. Ex. 5  | 17 | 91  | 28 | 45 | Poor | Good | 300 |
| Comp. Ex. 6  | 19 | 77  | 27 | 43 | Poor | Good | 135 |
| Comp. Ex. 7  | 18 | 84  | 30 | 41 | Poor | Good | 134 |
| Comp. Ex. 8  | 19 | 76  | 27 | 44 | Poor | Good | 117 |
| Comp. Ex. 9  | 22 | 106 | 41 | 35 | Poor | Good | 181 |
| Comp. Ex. 10 | 21 | 89  | 29 | 44 | Poor | Good | 207 |
| Comp. Ex. 11 | 19 | 101 | 35 | 33 | Poor | Good | 153 |
| Comp. Ex. 12 | 18 | 106 | 34 | 33 | Poor | Good | 153 |
| Comp. Ex. 13 | 28 | 112 | 40 | 34 | Poor | Good | 118 |

Evaluation of Test Materials

The test materials of Examples 1 to 13 are in the scope of the alloy composition of the present invention. The numbers of weld defects sufficiently satisfy the requirement of being under the reference 10, so the laser weldability was excellent. Further, the values of the elongation in the tensile tests were 30% or more, so the formability was also excellent. The test materials of Comparative Examples 1 to 3 and 6 to 8 were in the scope of the prescribed composition for the elements of Si, Fe, Cu, etc., but had Co contents of less than 0.001 mass % or outside of the prescribed composition, so had 10 or more weld defects and were inferior in laser weldability.

The test materials of Comparative Examples 4, 5, and 9 to 13 had a Co content within the scope of the prescribed composition, but had contents of one of the elements of Si, Fe, and Cu outside of the prescribed composition in range, so had 10 or more weld defects and were inferior in laser weldability. Specifically, the test material of Comparative Example 4 had a Fe content of 0.70 mass % or overly high, so had 24 weld defects and was inferior in laser weldability. The test material of Comparative Example 5 had a Si content of 0.42 mass % or overly high, so had 17 weld defects and was inferior in laser weldability. The test material of Comparative Example 9 had a Fe content of 0.68 mass % or overly high, so had 22 weld defects and was inferior in laser weldability. The test material of Comparative Example 10 had a Si content of 0.51 mass % or overly high, so had 21 weld defects and was inferior in laser weldability. The test material of Comparative Example 11 had a Cu content of 0.32 mass % or overly high, so had 19 weld defects and was inferior in laser weldability. The test material of Comparative Example 12 had a Cu content of 0.30 mass % or overly high, so had 18 weld defects and was inferior in laser weldability. The test material of Comparative Example 13 had a Cu content of 0.70 mass % or overly high, so had 28 weld defects and was inferior in laser weldability.

As a result of image analysis of the second phase particles in the metal structures of the test materials, in Examples 1 to 13, the numbers of second phase particles with a circle equivalent diameter of 3 μm or more were less than 100/mm² and the materials were evaluated as good. As opposed to this, in Comparative Examples 1 to 13, the numbers of second phase particles with a circle equivalent diameter of 3 μm or more were 100/mm² or more and the materials were evaluated as poor. The results of evaluation of the image analysis of the second phase particles in the metal structures of the final sheets which were produced from these permanent mold cast materials matched the results of evaluation of the above-mentioned laser weldability.

Examples Using DC Casting Material
Preparation of Final Sheet

Predetermined types of ingots and scrap materials were weighed, mixed, and loaded into a melting/holding furnace. When melted at 800° C., two charges of 1 kg of deslagging-use flux each were added, then a stirring rod was used to sufficiently stir the aluminum melt in the furnace. The melt was further allowed to settle for 30 minutes, then the slag which floated at the melt surface was removed by a stirring rod. For the insufficient components, various ingots etc. were added and the melt further stirred. After that, the melt was allow to further settle for 40 minutes and was sampled by a spoon to obtain a disk sample in a mold for analysis of composition.

The analysis values of composition of the melt in the furnace were confirmed, then the melt was run from the taphole to the trough. When the melt surface reached a predetermined position of the trough, the melt started to be poured from the dip tubes to the inside of the casting molds. When the melt surface reached predetermined positions of the casting molds in all of the casting molds, the bottom molds started to to lowered. The speed of descent of the bottom molds was 50 mm/min in a constant state. During the casting, the melt flowing in the trough was sampled by a spoon to obtain disk samples in a casting mold for analysis of composition. In this way, width 1350 mm×thickness 560 mm×length 3500 mm ingots were cast. The disk samples were analyzed by spectrophotometry to analyze the compositions. The results of the final analysis of the compositions of the melts are shown in Table 5.

wound in coils. After this, the coils were cold rolled without process annealing to obtain final thickness 1.0 mm cold rolled sheets. Furthermore, the coils were inserted into a batch furnace where they were held at 400° C. for 1 hour for final annealing treatment to obtain cold rolled annealed sheets.

Next, the thus obtained final sheets (test materials) were evaluated for formability and laser weldability and measured for number of second phase particles. For the evaluation of the formability and laser weldability, tests were run under similar conditions and evaluations were conducted under substantially the same way as in the case of the examples of the above-mentioned mold casting materials, so explanations will be omitted. However, in the examples using DC cast materials, for the evaluation of the laser weldability, test materials with less than 15 black defects with a circle equivalent diameter of 0.4 mm or more were evaluated as "good" in number of weld defects while test materials with 15 or more black defects with a circle equivalent diameter of 0.4 mm or more were evaluated as "poor" in number of weld defects. The results of evaluation of formability and laser weldability are shown in Table 6.

Measurement of Number of Second Phase Particles of Metal Structure

A vertical cross-section parallel to the rolling direction of the obtained final sheet (cross-section vertical to LT direction) was cut out, was buried in a thermoplastic resin, was polished to a mirror surface, and was etched by a hydrofluoric acid aqueous solution to examine the metal structure. The micro metal structure was photographed by an optical microscope (area per field: 0.0334 mm², 15 fields per sample photographed), the photograph was analyzed by image analysis, and the number of second phase particles with a circle equivalent diameter of 3 μm or more per unit area (1 mm²) was measured. Note that, in the examples according to the DC cast material, this measurement was repeated three times while changing the measurement locations to "a" to "c" for one level of test material.

In the examples using the DC cast material, for the final judgment of the number of second phase particles with a circle equivalent diameter of 3 μm or more, the average

TABLE 5

Chemical Composition of Test Materials

| Test Material No. | Chemical composition (mass %) | | | | | | | | |
|---|---|---|---|---|---|---|---|---|---|
| | Si | Fe | Cu | Mn | Mg | Zn | Ti | B | Co |
| Ex. 14 | 0.07 | 0.33 | <0.01 | <0.01 | <0.01 | <0.01 | <0.01 | <0.01 | 0.024 |
| Ex. 15 | 0.11 | 0.42 | 0.05 | <0.01 | <0.01 | <0.01 | <0.01 | <0.01 | 0.049 |
| Comp. Ex. 14 | 0.06 | 0.35 | <0.01 | <0.01 | <0.01 | <0.01 | <0.01 | <0.01 | <u>≤0.001</u> |
| Comp. Ex. 15 | 0.07 | 0.34 | 0.03 | <0.01 | <0.01 | <0.01 | <0.01 | <0.01 | <u>≤0.001</u> |

The cast ingots were cut to remove their front ends and rear ends and were shaved at their two surfaces by 10 mm at each side by a milling machine. The ingots were inserted into a homogenizing furnace where they were heated by a 30° C./hr rate of temperature rise and were held at 500° C. for 1 hour to homogenize them. After that, the ingots were hoisted by a crane and made to move from the homogenizing furnace to a table of the hot rolling mill where they were hot rolled by the hot rolled mill to thicknesses of 6 mm and value of the measurement values at the different measurement locations "a" to "c" was adopted. When the number of second phase particles with a circle equivalent diameter of 3 μm or more was 110/mm² to less than 1000/mm², the material was evaluated as "good". Further, when the number of second phase particles with a circle equivalent diameter of 3 μm or more was 1000/mm² or more, the material was evaluated as "poor". The results of image analysis and the results of evaluation are shown in Table 7.

TABLE 6

Results of Evaluation of Test Materials (Weldability and Formability)

| Test Material No. | No. of weld defects (no.) | Tensile characteristics | | | Weldability (No. of defects) | Formability (Elongation) |
|---|---|---|---|---|---|---|
| | | UTS (MPa) | YS (MPa) | Elongation (%) | | |
| Ex. 14 | 8 | 77 | 42 | 48 | Good | Good |
| Ex. 15 | 9 | 80 | 45 | 44 | Good | Good |
| Comp. Ex. 14 | 17 | 77 | 40 | 44 | Poor | Good |
| Comp. Ex. 15 | 21 | 81 | 43 | 41 | Poor | Good |

TABLE 7

Results of Evaluation of Test Materials (No. of Second Phase Particles)

| Test Material No. | No. of second phase particles with circle equivalent diameters of 3 µm or more (/mm$^2$) | | | Average value | Evaluation |
|---|---|---|---|---|---|
| | a | b | c | | |
| Ex. 14 | 146 | 251 | 117 | 171 | Good |
| Ex. 15 | 673 | 424 | 779 | 625 | Good |
| Comp. Ex. 14 | 1255 | 2279 | 1096 | 1543 | Poor |
| Comp. Ex. 15 | 1773 | 1391 | 2439 | 1868 | Poor |

Evaluation of Test Materials

The test materials of Examples 14 and 15 were in the scope of the alloy composition of the present invention and had numbers of weld defects sufficiently satisfying the reference level of less than 15, so were excellent in laser weldability. Further, the values of elongation in the tensile tests were also 30% or more, so the materials were excellent in formability. The test materials of Comparative Examples 14 and 15 had Si, Fe, Cu, and other elements within the scope of the prescribed composition, but in all cases had Co contents of less than 0.001 mass % or low ones outside the scope of the prescribed composition, so had 15 or more weld defects and were inferior in laser weldability.

As a result of image analysis of the second phase particles in the metal structures of the test materials, in Examples 14 and 15, there were 110/mm$^2$ to less than 1000/mm$^2$ second phase particles with a circle equivalent diameter of 3 µm or more, so the materials were evaluated as "good". As opposed to this, in Comparative Examples 14 and 15, there were 1000/mm$^2$ or more second phase particles with a circle equivalent diameter of 3 µm or more, so the materials were evaluated as "poor". The results of evaluation of the image analysis of the second phase particles in the metal structure of the final sheet which is produced from these DC cast slabs matched the above-mentioned results of evaluation of laser weldability.

The invention claimed is:

1. An aluminum alloy sheet suitable for battery case use, which sheet is excellent in formability and weldability, and which sheet is produced from a DC cast slab having a chemical composition which contains Si: 0.01 to 0.4 mass %, Fe: 0.3 to 0.5 mass %, and Co: 0.002 to 0.3 mass %, has a balance of Al and impurities, and is restricted in Cu as an impurity to less than 0.2 mass %, and having a metal structure with a number of second phase particles with a circle equivalent diameter of 3 µm or more of 110/mm$^2$ to less than 1000/mm$^2$.

2. The aluminum alloy sheet suitable for battery case use excellent in formability and weldability according to claim 1, having a value of elongation of 30% or more.

* * * * *